United States Patent [19]

Zielinski et al.

[11] 4,453,043

[45] Jun. 5, 1984

[54] TELEPHONE FOR A PHYSICALLY HANDICAPPED PERSON

[75] Inventors: Lech S. Zielinski, Ottawa; Conrad Lafrance, Alymer; Jacek J. Wojcik, Nepean, all of Canada

[73] Assignee: Northern Telecom Limited, Montreal, Canada

[21] Appl. No.: 345,936

[22] Filed: Feb. 4, 1982

[51] Int. Cl.³ .......................... H04M 1/26; H04M 1/00
[52] U.S. Cl. .......................... 179/90 BD; 179/90 AD; 179/81 R
[58] Field of Search .......... 179/90 BD, 90 AD, 90 R, 179/1 VC, 81 R, 1, 1 HF, 1 HS

[56] References Cited

U.S. PATENT DOCUMENTS

| | | | |
|---|---|---|---|
| 3,170,990 | 2/1965 | Beatty | 179/90 AD X |
| 3,612,766 | 10/1971 | Ferguson | 179/81 R X |
| 3,848,249 | 11/1974 | Meiri | 179/1 HF X |
| 4,293,740 | 10/1981 | Gibb et al. | 179/1 HF X |
| 4,329,543 | 5/1982 | Danford | 179/1 HF |

Primary Examiner—Stafford D. Schreyer
Attorney, Agent, or Firm—Stuart L. Wilkinson

[57] ABSTRACT

A telephone for a physically handicapped person has a transducer which is selected for easy actuation by the handicapped person. The transducer may, for example, be operated orally. When the transducer is first operated, a switch under the control of the transducer causes the telephone line switch to go "off hook" and, after a suitable delay, causes outpulsing of a zero signal to alert the operator. Once contact with the operator is established, the caller who has access to a telephone microphone, asks the operator to place the call and subsequently participates in it. Following the termination of the call, the transducer is operated again to reactuate the line switch and return the telephone set to its "on hook" condition. A similar procedure is followed when a call is received by the handicapped person. However, in this case, since no zero dialling is required, ringing voltage on the line is detected and, while present, zero dialling in response to transducer actuation is prevented.

1 Claim, 3 Drawing Figures

TELEPHONE FOR A PHYSICALLY HANDICAPPED PERSON

This invention relates to a telephone for use by a physically handicapped person.

In 1981, attention has focused on the handicapped and, in particular, ways in which the handicapped person's environment may be altered to enable the person to overcome the apparent limitations imposed by the particular handicap.

Operation of a conventional telephone can be a fairly daunting task for a person with severely limited motor ability, for example, a para- or quadriplegic. The operations involved in participating in a telephone call are initiation, receiving and termination of the call. Analyzing these operations from the point of view of calling and called party movement, the handicapped person must station himself close to the telephone set, must lift the telephone handset to operate the hook switch, must dial a number if he is the calling party, must hold the handset in a position to both hear and speak, and, lastly, must return the handset to the telephone cradle. For a severe physical handicap, the series of operations may be impossible. The present invention proposes a circuit for use in a telephone system which will enable easy and effective use of the telephone system by such a handicapped person.

According to the invention, there is provided a call sequence control circuit for use in a telephone system, the circuit comprising:
a transducer;
switch means under the control of the transducer operable to make and break an electrical connection between a telephone speech circuit and the telephone line;
signal generating means under the control of the transducer for generating a signal representing a predetermined telephone number and for transmitting the signal to the line;
detector means for detecting ringing voltage on the telephone line; and
control means for preventing transmission of said signal while ringing voltage is being detected by the detector means.

The switch means preferably includes a primary switch which controls both the operation of the signal generating means and the actuation of a relay controlled telephone hook switch.

The circuit preferably includes means for establishing a delay between operation of the hook switch and operation of the signal generating means in order that dial tone can be established from a telephone central office. The transducer can include a diaphragm switch operated by a pressure differential caused by a telephone user blowing or sucking into the transducer. The transducer can, alternatively, be an impact or touch switch. The signal generating means is preferably adapted to produce zero dialling so as to contact the telephone operator to whom verbal instructions can be given for placement of the call. The signal generating means and the detector means should be connected to the telephone line via optical isolators. The isolators prevent noise and high current surges from appearing on the line.

The telephone speech circuit preferably includes a microphone mounted on a movable boom. It can also include any one of a loudspeaker, an earphone, or a headset.

An embodiment of the invention will now be described, by way of example, with reference to the accompanying drawings in which.

Figure 1:
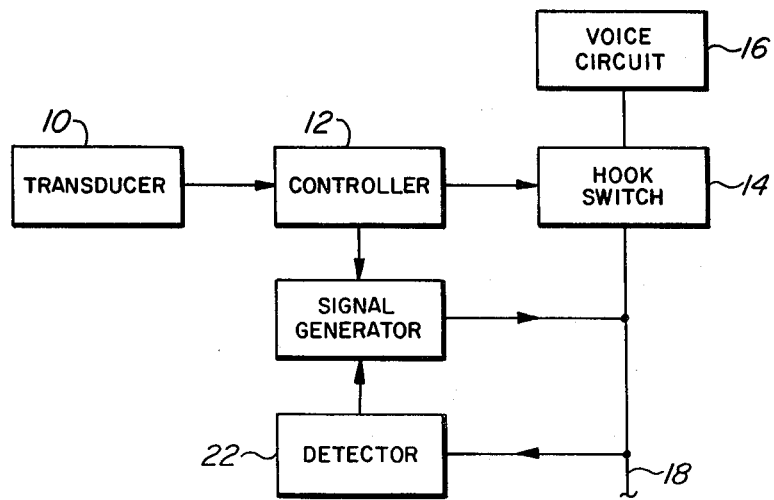
FIG. 1 is a block diagram showing the essential elements of a telephone call sequence control circuit according to the invention.

Referring particularly to FIG. 1, the circuit consists of a transducer 10 and a controller 12 connected to the transducer. The controller functions to operate a hook or line switch 14 to connect a voice circuit 16 to line 18 to initiate a call, and to disconnect the voice circuit from line to terminate the call. The controller 12 also controls a signal generator 20 which produces a dialling signal to the line 18. Lastly, a ringing voltage detector 22 detects ringing voltage on the line associated with an incoming call and while ringing voltage exists, prevents signalling data from going to line for a predetermined period after the transducer 10 is operated.

Figure 2:
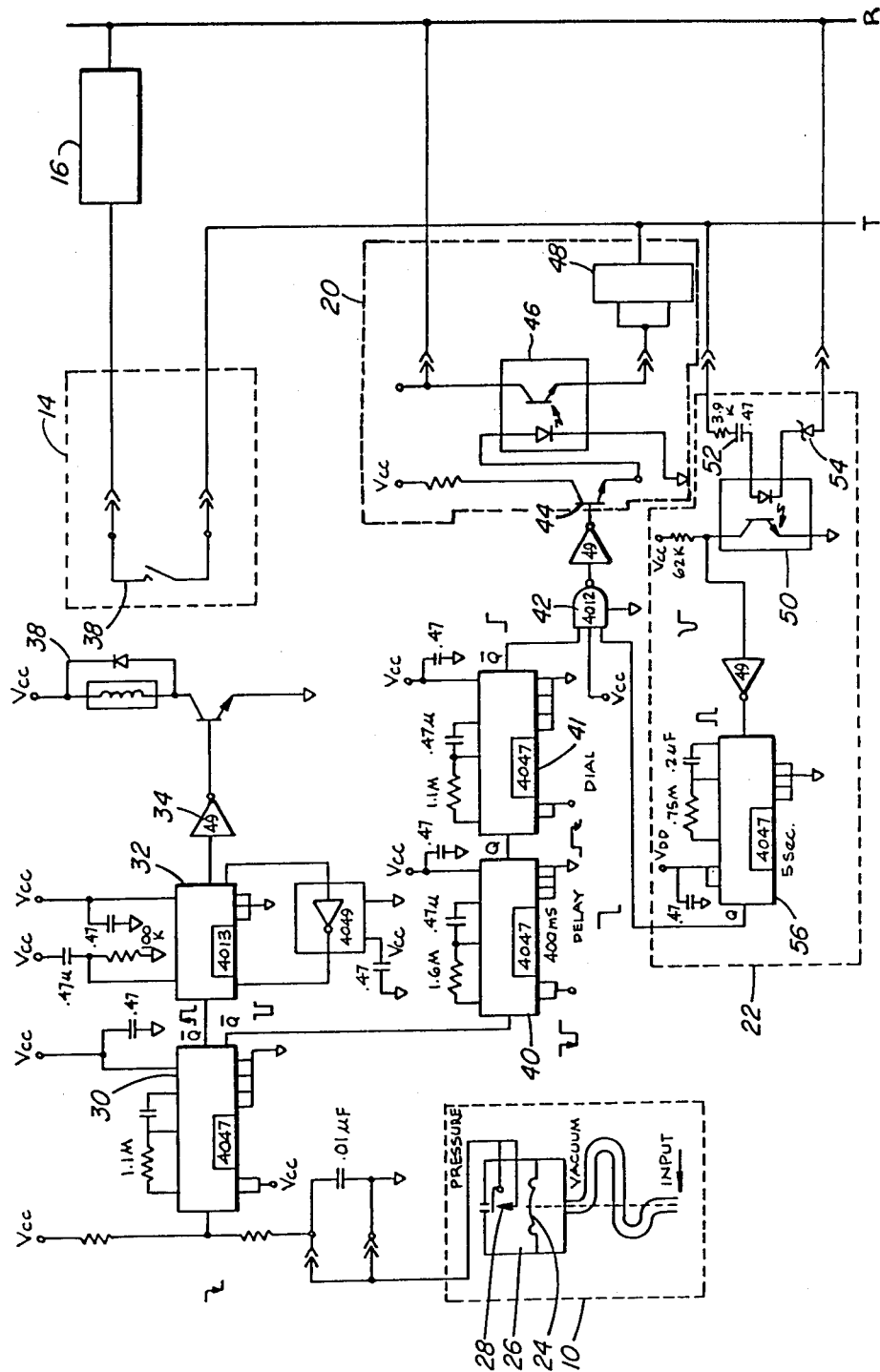
FIG. 2 is a circuit schematic diagram showing the blocks of FIG. 1 in more detail.

Referring in detail to FIG. 2, the transducer 10 includes a diaphragm 24 which is distorted, when a sufficiently high pressure differential is produced in a chamber 26, to operate switch contacts 28. Such a transducer is available from Fairchild Corporation under the Specification No. PSF106-1.5H. The switch contact pulse actuates a monostable 30 having a 22 ms delay so as to remove switch contact bounce. One output of the monostable 30 is taken to a flip-flop 32. The flip-flop produces an output in response to every input pulse. The flip-flop output is coupled via an inverter 34 to the base of a transistor 36 which is series connected to a relay 38. The relay controls the telephone "hook switch" 14 to make and break a connection between the telephone line and the telephone speech circuit 16.

Another output from the monostable 30 is taken to a second monostable 40 which establishes a longer delay of 400 ms. The output from the monostable 40 is taken via an inverter 41 to a NAND gate 42, an output from which controls a transistor 44. When the transistor conducts, an optical isolator 46 switches the output of an E-Digipulse (RTM) integrated circuit to the telephone line. The E-Digipulse circuit is a standard integrated circuit utilized on a telephone circuit PCB 48 available from Northern Telecom under specification No. QDN 35 BX and is used to produce dial pulse signalling from keypad or other non-rotary dials. As indicated, two of the Digipulse terminals are strapped together so that the circuit outpulses only a single "ZERO" indication for every input pulse to the circuit. The 400 ms. delay before "ZERO" outpulsing ensures that in normal circumstances the central office receiving equipment has been readied to receive signalling information. When the "ZERO" indication is received at the central office, the telephone operator establishes a voice connection with the telephone user, thereby automatically switching out the E-Digipulse circuit. Once voice communication has been made, the telephone user states the particular number that he wishes to reach and the connection is made by the operator.

Call termination is achieved simply by operating the transducer 10 again, the flip-flop output then causing the relay 38 to drop out and to restore the "hook switch" to an "on hook" position in which the connection between the voice circuit and line is broken.

The circuit illustrated in FIG. 2 is also adapted to handle an incoming call. A low voltage output, generated from ringing voltage by a voltage tap, is directed to an optical isolator 50 when ringing voltage is present. The voltage tap includes a capacitor 52 to prevent operation in response to DC and low voltage signals. A zener diode 54 conducts when ringing voltage (80 V RMS), is present. The optical isolators 46 and 50 are standard units incorporating a light emitting diode and a phototransistor. The output from the optical isolator 50 is taken to a monostable 56 which, for a period of 5 seconds after the start of each ringing burst, disables the NAND gate 42. Since the ringing voltage bursts have a duration of only 4 seconds, this means that the NAND gate will not operate while ringing voltage is present. Thus even if the transducer switch is operated by the handicapped user, there is no "ZERO" outpulsing to the central office. Operation of the transducer switch merely causes the "hook switch" to go "off hook," so establishing a voice path.

Figure 3:
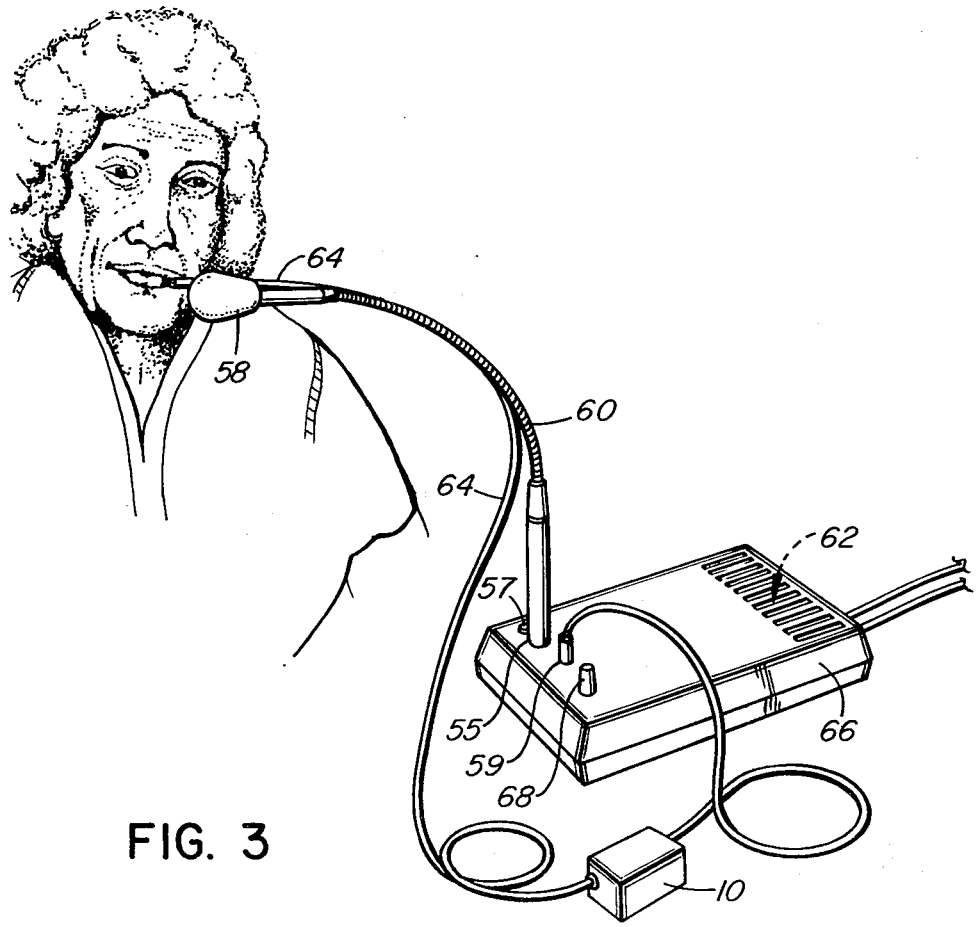
FIG. 3 shows a telephone for the disabled incorporating the circuit of FIG. 1.

As illustrated in FIG. 3, transduction features of the voice circuit are also adapted for use by the handicapped telephone user. Thus, the telephone instrument has no conventional handset, but instead has jacks 55, 57 and 59 respectively for a plug-in transmitter unit, receiver unit, and transducer switch unit, the jacks providing the opportunity of several options depending on the nature of the handicap and on the handicapped person's surroundings. In the particular example shown in FIG. 3, the transmitter unit has a microphone 58 mounted on a flexible boom 60 and the receiver unit incorporates a loudspeaker 62 housed in a base set cabinet 66, and controlled by volume knob 68. As shown in FIG. 3, a tube 64, forming part of an oral transducer, is also mounted on the boom 60.

In order to preserve some privacy in the event that the handicapped telephone user desires it, there is optionally provided a lightweight headset (not shown) incorporating a microphone and receiver and a combination plug for insertion in jacks 55 and 57.

Although the particular call sequence control circuit is described and shown in conjunction with a transmitter and receiver features particularly adapted for the handicapped, it need not be so limited. Thus, for example, much work is being done in speech recognition and interpolation systems. A call sequence control circuit of the type described can be adapted to take advantage of state of the art speech recognition equipment. Thus, the transducer 10 of FIG. 1 could include a speech interpolation unit and the controller can be adapted to produce a data control signal to the signal generator to prompt the automatic generation and transmission of any telephone number. In use, verbal instruction is monitored by the speech interpolation unit which has an output to the controller. The controller connects the voice circuit to line and, if appropriate, dials a remote telephone number.

What is claimed is:

1. A call sequence control circuit for use in a telephone system for use by a physically handicapped person comprising:

a transducer;

a controller under the control of the transducer operable to make and break an electrical connection between a telephone speech circuit and a telephone line;

signal generating means under the control of the controller for generating an alerting signal and for transmitting the signal to the telephone line;

detector means for detecting ringing voltage on the telephone line; and inhibiting means under the control of the detector means for preventing transmission of said alerting signal while ringing voltage is being detected by the detector means.

* * * * *